June 10, 1930.  E. ABORN  1,762,208
COFFEE BREWING APPARATUS
Filed March 22, 1928   2 Sheets-Sheet 1
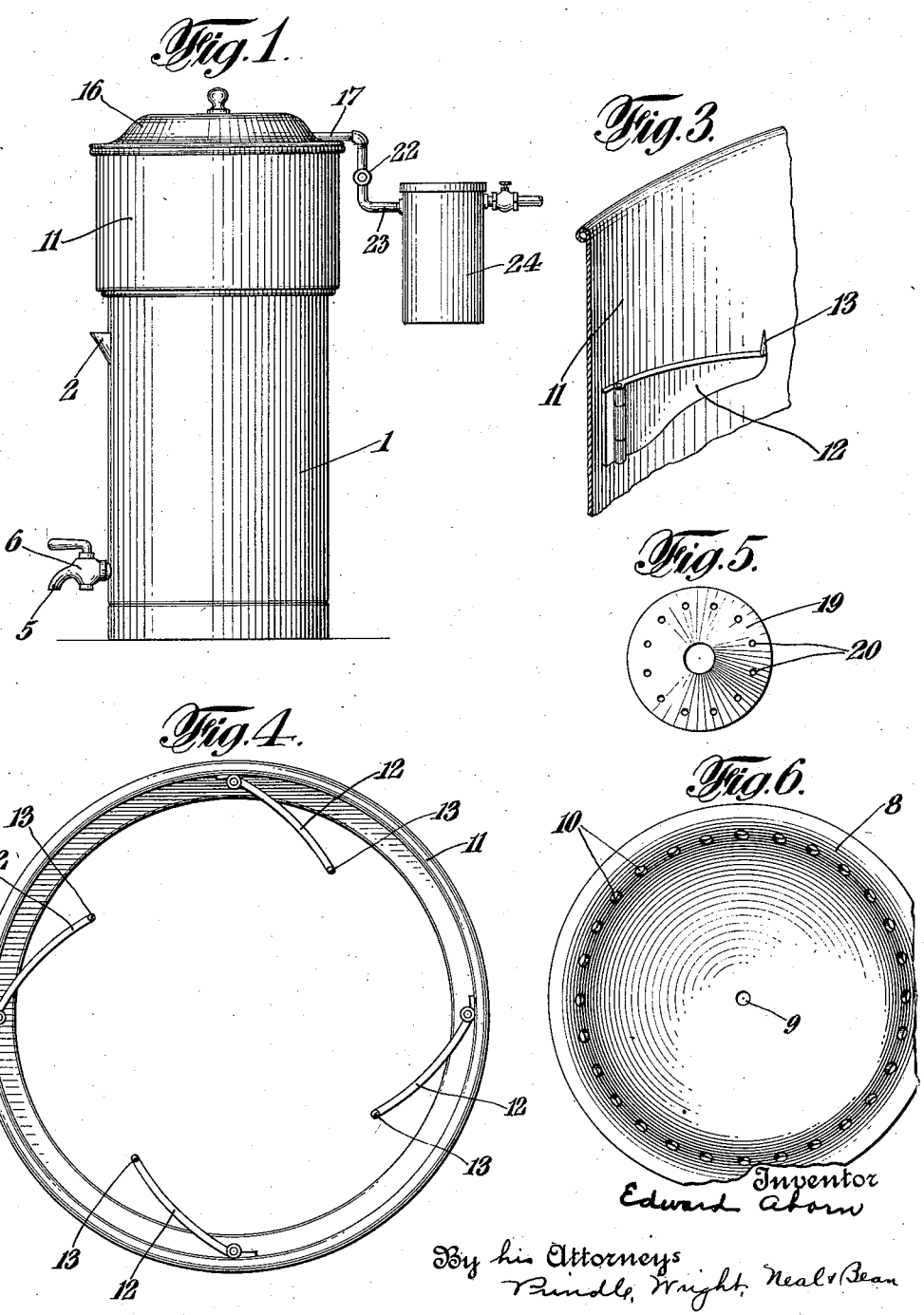

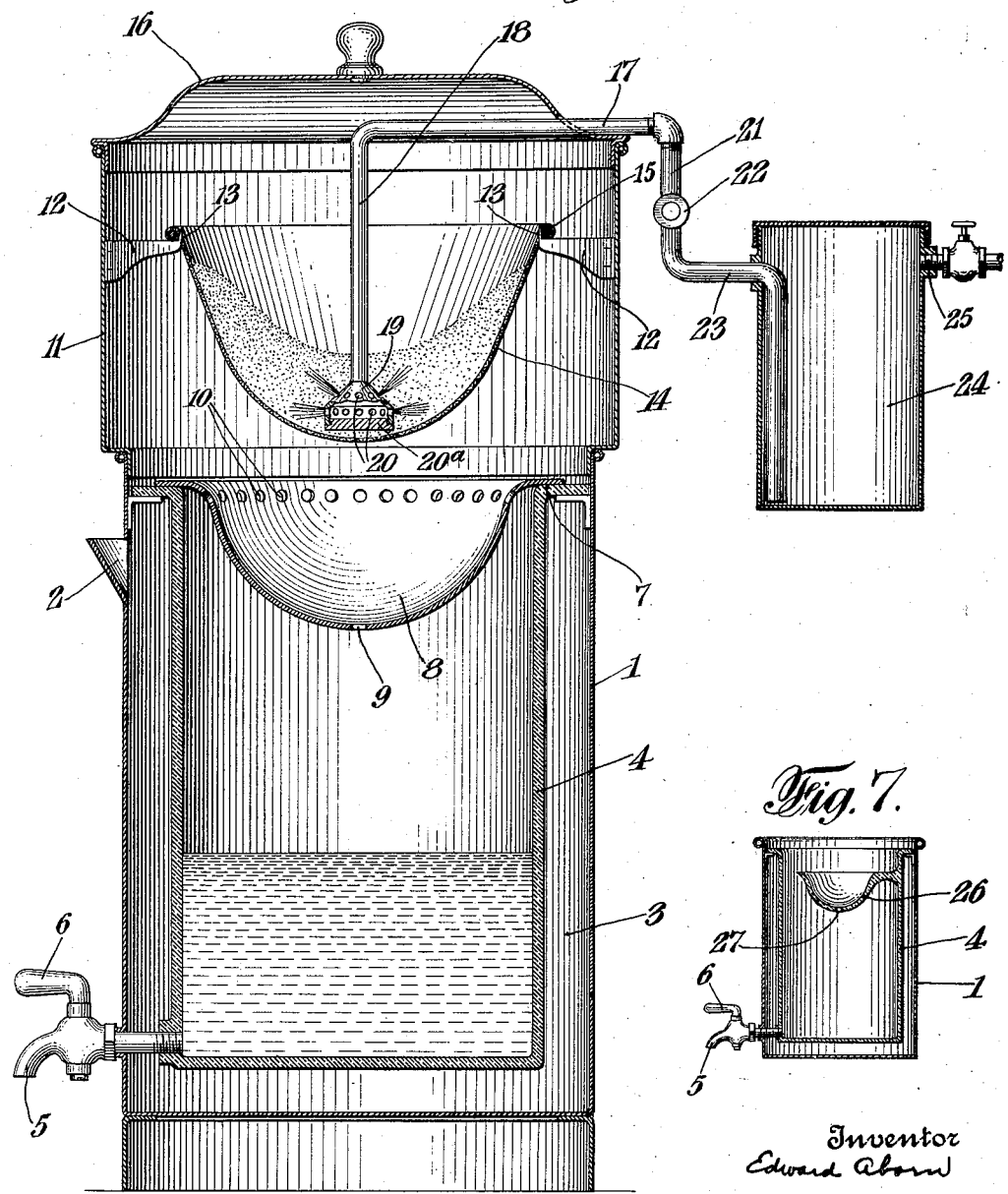
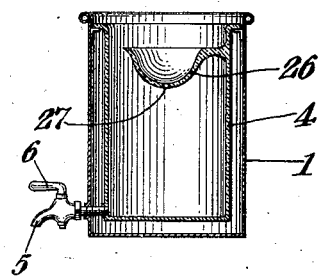

Patented June 10, 1930

1,762,208

UNITED STATES PATENT OFFICE

EDWARD ABORN, OF EAST ORANGE, NEW JERSEY

COFFEE-BREWING APPARATUS

Application filed March 22, 1928. Serial No. 263,815.

My invention relates particularly to a coffee brewing apparatus which is designed to overcome many previous disadvantages, especially in coffee machines of large size.

The object of my invention is to provide an apparatus in which coffee may be brewed without the disadvantages inherent in previous constructions. The object is particularly to provide means whereby the coffee may be subjected to the action of the water fed into the apparatus more effectively, in that the water being supplied to the lower portion of the ground coffee prevents the coffee from compacting and, therefore, renders it more accessible to the brewing action within the apparatus, and, furthermore, spreads the ground coffee outwardly and upwardly during the rising current of water therein so as to provide a larger area over a wider diameter in the body of coffee being subjected to the brewing action. This action, also, causes the coffee to be extracted gradually, part of the coffee being floated upwardly to be last extracted by the water. The object is, furthermore, by this means, to avoid leaching out the deleterious matters from the coffee as much as possible by avoiding the necessity of making a strong extraction, such as would be the case were the ground coffee to become compacted. Furthermore, by causing the spreading of the body of ground coffee outwardly and upwardly there is a pocket formed in the coffee which causes the water to seep out gradually through the sides of the body of coffee, and prevents the water passing out above the level of the coffee without passing through the same. Likewise, by feeding water upwardly in the body of coffee the tendency for the stream of water to dig a hole in the body of the ground coffee is avoided, thus attaining better distribution of the water in the coffee. Furthermore, by regulating the outlet of the water which is fed into the bottom of the body of coffee, as, for example, the arrangement and number of outlet holes, the distribution and quantity of the water can be regulated accordingly. This enables the most thorough extraction of the coffee to be attained for the given quantity of ground coffee treated, thus producing a more uniform brew, as well as a better timing of the same. Furthermore, there is a better quality of brew produced due to the fact that there is still an effective extraction attainable in the brewing later in the period of brewing than would otherwise be the case. Accordingly, the taste of the dregs in the coffee is avoided at the end of the brew. This result is aided by reason of the fact that the top layer of coffee remains until the last to be extracted. Furthermore, the water fed into the coffee stays hotter by reason of the central feed within the body of coffee. For the above reasons it is not necessary to repour the liquid through the ground coffee. This mode of operation enables coffee which has been more finely ground to be used without compacting, etc. Again, in order to avoid stratification of the different strengths of coffee in the brew I have provided an equalizer pan which causes the coffee to become mixed before being received in the bottom of the urn, whence it is drained off for use. In addition, the construction is such that the filter-cloth holding-frame may be of different sizes to fit different sized coffee urns.

While my invention is capable of embodiment in many different forms, for the purpose of illustration I have shown only certain forms of the same in the accompanying drawings, in which—

Fig. 1 is a side elevation of a coffee apparatus made in accordance with my invention;

Fig. 2 is a vertical section through the same;

Fig. 3 is an enlarged side elevation of one of the pivoted brackets for holding the coffee-filter-cloth frame;

Fig. 4 is a plan view showing the arrangement of the brackets within the top of the urn;

Fig. 5 is a plan view of the distributer nozzle for the hot water supply;

Fig. 6 is a plan view of the equalizer pan; and

Fig. 7 is a cross section of a modification of my invention.

In the drawings, I have shown a coffee apparatus comprising a hot water jacket 1, having a filling opening 2 at the side thereof for the introduction of a body of hot water 3, which is kept hot by the application of heat to the bottom of the jacket, any steam thus formed being allowed to pass out also through the filling opening 2. Within the jacket 1 there is provided an urn 4 made of porcelain, or any other suitable material, adapted to receive brewed coffee, a faucet 5 with a hand-valve 6 being provided for the withdrawal of the brewed coffee. Near the top of the urn 4 there is a seat 7 for receiving an equalizer pan 8 provided with a central opening 9 and a peripheral set of apertures 10, the openings 9 and 10 being of such a size as to cause the accumulation of the strong brewed coffee therein before passing out through said openings to the bottom of the urn 4 for mixing with the brewed coffee therein. At the top of the apparatus there is a removable section 11 having therein a plurality of radially directed hinged brackets 12 supported from the inner wall of the removable section 11, each of said brackets 12 having at its end an upwardly directed pin 13 for engagement with a coffee-filter-cloth 14 which is approximately hemispherical in shape, and which is supported at its edges by means of a metal ring 15. The pins 13 are engaged with the filter-cloth 14 just inside of the ring 15. A cover 16 is arranged to be removably applied to the top of the removable section 11, but in such a manner as to permit at one edge thereof, the entry of a hot water supply valve pipe 17 which enters at the side of the removable section 11 and has a vertical end 18 provided at its lowermost portion with a circular nozzle 19 having laterally and upwardly directed holes 20 therein, the size and number of which may be varied according to the distribution of hot water desired in the particular apparatus. Also, a screw-threaded clean-out cap 20ª is provided thereon. The outer end of the pipe 17 has a downwardly directed portion 21 which is connected by a hinged shut-off valve 22, which closes when the pipe 17 is raised to a vertical position, to a pipe 23 leading to a pressure hot-water supply tank 24 provided with heated water by a valve inlet pipe 25. In Fig. 7 I have shown a modified form of my invention, in which, instead of the pan 8 there is a cup 26 formed integral with the urn, having a lower aperture 27 comparable to the aperture 9, and instead of having the holes 10, the liquid can overflow over the edge of the cup when the latter is full.

In the operation of the apparatus made in accordance with my invention, a quantity of the ground coffee, which may be finer than the coffee previously found suitable in the brewing of coffee, is placed in the coffee-filter-cloth 14, which is then inserted into the removable section 11 of the apparatus in such a manner that the swinging brackets 12 have their pins 13 inserted into the filter-cloth just inside of the ring 15. The hinged pipe 17 is then pushed into the body of ground coffee until the circular nozzle 19 is in the middle of the body of coffee and at the bottom thereof. Or, if desired, these steps may be reversed by inserting the nozzle 19 into the filter-cloth 14 after the latter has been supported on the brackets 12 and the very finely ground coffee might be introduced thereafter to the desired depth in the filter-cloth 14. A supply of hot water will also be introduced into the water jacket 1 to the desired level. Thereupon, the valve in the pipe 17 is opened to provide a supply of hot water to the body of coffee in the apparatus. Because of the laterally and upwardly directed openings in the nozzle 19 the ground coffee will not only become loosened during the application of the water fed into the same but the body of coffee will rise upwardly along the sides of the filter-cloth 14 in the direction of exit of the body of water through the cloth, and some water will, of course, accumulate in the pocket thus formed above the body of coffee. As the brewing proceeds the liquid coffee will be received into the pan 8 where it will drip out very gradually into the urn 4, thus causing an effective mixing of the brewed coffee to prevent any stratification of the same with consequent undesirable variation in the strength of the coffee drawn off from the faucet 5. The brewed coffee can thus be served at once from the urn 4 before the brew is completed, thus avoiding the usual delay which is caused by the necessary mixing of the brewed coffee. When the required amount of coffee has been brewed the valve in the pipe 17 will, of course, be closed, and when the brewing has been entirely completed the removable section 11 may be, if desired, lifted off from the top of the apparatus and the lid 16 may be placed on top of the urn 4, in the water jacket 1, so that the urn and the water jacket together with the cover 16, may be transported to another position or place for the withdrawal of the hot brewed coffee from the faucet 5, as desired.

While I have described my invention above in detail I wish it to be understood that many changes may be made therein without departing from the spirit of the same.

I claim:

1. An apparatus for brewing coffee, comprising a filter-cloth adapted to hold a body of coffee, and a container for receiving the same having an inwardly adjustable bracket for supporting the filter-cloth.

2. An apparatus for brewing coffee, comprising a filter-cloth adapted to hold a body of coffee, and a container for receiving the same having an inwardly adjustable hinged bracket for supporting the filter-cloth.

3. An apparatus for brewing coffee, comprising a filter-cloth adapted to hold a body of coffee, and a container for receiving the same having an inwardly adjustable hinged bracket with an upwardly directed engaging pin thereon for supporting the filter-cloth.

4. An apparatus for brewing coffee having means for supporting a body of coffee while being subjected to the action of water near the top of said apparatus, and an equalizer pan located above the level of the liquid coffee in the apparatus and adapted to catch the drippings from the body of coffee for mixing the brewed coffee before reaching the level of said liquid and withdrawal from the apparatus, said pan having a small opening in its bottom from which the brewed coffee may drip gradually into the liquid coffee.

5. An apparatus for brewing coffee having means for supporting a body of coffee while being subjected to the action of water near the top of said apparatus, and an equalizer pan located above the level of the liquid coffee in the apparatus, having a plurality of distributing openings, with a small opening in the bottom from which the brewed coffee may drip slowly and adapted to catch the drippings from the body of coffee for mixing the brewed coffee so that when it reaches the level of the liquid in the apparatus it is ready to be dispensed.

6. An apparatus for brewing coffee having means for supporting a body of coffee while being subjected to the action of water near the top of said apparatus, and an equalizer pan located above the level of the liquid coffee in the apparatus, having a plurality of distributing openings, one of which is centrally located in the bottom of said pan and is only large enough to permit the brewed coffee to drip gradually from it, and the others of which are peripherially located therein near the top, said equalizer pan being adapted to catch the drippings from the body of coffee for mixing the brewed coffee so that when it reaches the level of the liquid in the apparatus it is ready to be dispensed.

7. An apparatus for brewing coffee, comprising a container, adjustable means for supporting a body of ground coffee therein, a discharge nozzle with upwardly directed openings for supplying heated water to said coffee, and an equalizer pan for equalizing the strength of the brewed coffee which drips from the body of ground coffee located above the level of the liquid coffee in the apparatus, said pan having a small opening in its bottom from which the brewed coffee may gradually drip.

8. An apparatus for brewing coffee, comprising a container, adjustable means for supporting a body of ground coffee therein, and upwardly directed discharge nozzle for supplying heated water to said coffee, and an equalizer pan for equalizing the strength of the brewed coffee which drips from the body of ground coffee, said container having a removable section carrying the adjustable supporting means.

9. An apparatus for brewing coffee, comprising a container, adjustable means for supporting a body of ground coffee therein, an upwardly directed discharge nozzle for supplying heated water to said coffee, and an equalizer pan for equalizing the strength of the brewed coffee which drips from the body of ground coffee, said container having a removable section carrying the adjustable supporting means, the equalizer pan being removably supported in the apparatus beneath the adjustable section.

10. An apparatus for brewing coffee having a filter-cloth for receiving the ground coffee, and a water pipe for supplying water thereto, provided with a discharge nozzle arranged in the lower portion of the filter cloth and having upwardly directed discharge openings and radial laterally directed discharge openings beneath the upwardly directed discharge openings.

11. An apparatus for brewing coffee having a filter-cloth for receiving the ground coffee, and a water pipe for supplying water thereto, provided with a discharge nozzle arranged in the lower portion of the filter cloth and having upwardly directed discharge openings and radial laterally directed discharge openings beneath the upwardly directed discharge openings, adapted to be located within the body of coffee.

12. An apparatus for brewing coffee having a filter-cloth for receiving the ground coffee, and a water pipe for supplying water thereto, provided with a discharge nozzle arranged in the lower portion of the filter cloth and having upwardly directed discharge openings and radial laterally directed discharge openings beneath the upwardly directed discharge openings, adapted to be located centrally within the body of coffee.

13. An apparatus for brewing coffee having a filter-cloth for receiving the ground coffee, and a hinged removable water pipe for supplying water thereto, provided with a discharge nozzle arranged in the lower portion of the filter cloth and having upwardly directed discharge openings and radial laterally directed discharge openings beneath the upwardly directed discharge openings, adapted to be located centrally within the body of coffee.

14. An apparatus for brewing coffee having means for receiving the ground coffee, a water pipe for supplying water thereto provided with a discharge nozzle arranged in the lower portion of the filter cloth and having upwardly directed discharge openings and radial laterally directed discharge openings beneath the upwardly directed discharge openings, and a hinged shut-off valve in the water pipe whereby when the water pipe is in raised condition the water is shut off.

15. An apparatus for brewing coffee having a filter cloth for receiving the ground or pulverized coffee, a water pipe for supplying water thereto provided with a discharge nozzle arranged in the lower portion of the filter cloth and having upwardly directed discharge openings and radial laterally directed discharge openings beneath the said upwardly directed openings and an equalizer pan located between the filter cloth and the liquid coffee in the apparatus.

16. An apparatus for brewing coffee comprising a filter cloth adapted to hold a body of pulverized or ground coffee, a hinged removable water pipe for supplying water thereto provided with a discharge nozzle adapted to extend into the body of the coffee in the lower portion of the filter cloth and having upwardly directed discharge openings and laterally directed discharge openings and an equalizer pan intermediate the filter cloth and the bottom of the apparatus.

17. An apparatus for brewing coffee comprising a filter cloth adapted to hold a body of pulverized or ground coffee, a hinged removable water pipe for supplying water thereto provided with a discharge nozzle adapted to extend into the body of the coffee in the lower portion of the filter cloth and having upwardly directed discharge openings and laterally directed discharge openings and an equalizer pan intermediate the filter cloth and the bottom of the apparatus, said equalizer pan being provided at its bottom portion with a restricted opening and near its top portion with a plurality of openings whereby strong coffee flows through the restricted opening and weaker coffee through the plurality of openings to produce a potable coffee when the liquid reaches the level of the liquid in the apparatus.

18. An apparatus for brewing coffee having a filter cloth for receiving ground coffee, and a water pipe for supplying water thereto, provided with a discharge nozzle arranged in the lower portion of the filter cloth and having an upwardly directed discharge opening and a laterally directed discharge opening.

19. An apparatus for brewing coffee having a filter cloth for receiving the ground coffee, and a water pipe for supplying water thereto, provided with a discharge nozzle arranged in the lower portion of the filter cloth and having an upwardly directed discharge opening and a laterally directed discharge opening adapted to be located within the body of ground coffee.

20. An apparatus for brewing coffee having a filter cloth for receiving the ground coffee, and a water pipe for supplying water thereto, provided with a discharge nozzle arranged in the lower portion of the filter cloth and having an upwardly directed discharge opening and a laterally directed discharge opening adapted to be located centrally within the body of coffee.

21. An apparatus for brewing coffee having a filter cloth for receiving the ground coffee, and a hinged removable water pipe for supplying water thereto, provided with a discharge nozzle arranged in the lower portion of the filter cloth and having an upwardly directed discharge opening and a laterally directed discharge opening adapted to be located centrally within the body of coffee.

In testimony that I claim the foregoing, I have hereunto set my hand this 20th day of March, 1928.

EDWARD ABORN.